(12) United States Patent
Gu et al.

(10) Patent No.: US 11,920,955 B2
(45) Date of Patent: Mar. 5, 2024

(54) SENSOR MOUNTING APPARATUS

(71) Applicant: Beijing Tusen Zhitu Technology Co., Ltd., Beijing (CN)

(72) Inventors: Xiaoping Gu, Beijing (CN); Jie Sun, Beijing (CN)

(73) Assignee: BEIJING TUSEN ZHITU TECHNOLOGY CO., LTD., Beijing (CN)

( * ) Notice: Subject to any disclaimer, the term of this patent is extended or adjusted under 35 U.S.C. 154(b) by 633 days.

(21) Appl. No.: 17/134,042

(22) Filed: Dec. 24, 2020

(65) Prior Publication Data

US 2021/0116269 A1  Apr. 22, 2021

Related U.S. Application Data (63) Continuation of application No. PCT/CN2019/093590, filed on Jun. 28, 2019.

(30) Foreign Application Priority Data

Jun. 28, 2018 (CN) .......................... 201810692082.9

(51) Int. Cl.
*G01D 11/30* (2006.01)
*B08B 1/00* (2006.01)
*B08B 1/04* (2006.01)
*B60S 1/08* (2006.01)

(52) U.S. Cl.
CPC .............. *G01D 11/30* (2013.01); *B08B 1/006* (2013.01); *B08B 1/04* (2013.01); *B60S 1/08* (2013.01)

(58) Field of Classification Search
CPC ........... G01D 11/30; B08B 1/006; B08B 1/04; B08B 1/008; B60S 1/08; B60S 1/3404;

(Continued)

(56) References Cited

U.S. PATENT DOCUMENTS 6,453,504 B1 * 9/2002 Burkard ................ B60R 1/0602
15/250.19
6,527,000 B1 * 3/2003 Randmae ........... G08B 13/1963
134/102.1

(Continued)

FOREIGN PATENT DOCUMENTS

CN      102616210 A      8/2012
CN      107264472 A      10/2017

(Continued)

OTHER PUBLICATIONS

International Application No. PCT/CN2019/093590, International Search Report and Written Opinion, dated Sep. 11, 2019, pp. 1-10.

(Continued)

*Primary Examiner* — Xin Y Zhong
(74) *Attorney, Agent, or Firm* — Perkins Coie LLP (57) ABSTRACT

A sensor (100) mounting apparatus is provided, including a housing (10), a guiding component (20) provided on the housing (10), a first cleaning member (30) slidably arranged on the guiding component (20), and a first driving element (40). The housing (10) has an accommodating cavity (11), the first driving element (40) is configured to drive the first cleaning member (30) to slide along the guiding component (20), and the first cleaning member (30) includes a second driving element (31) and a cleaning element (32) in transmission connection with the second driving element (31). The second driving element (31) is configured to drive the cleaning element (32) to swing back and forth around a direction perpendicular to a light-transmitting surface (12).

18 Claims, 4 Drawing Sheets

(58) Field of Classification Search
CPC .. B60S 1/522; B60S 1/54; B60S 1/566; B60S 1/56; G01S 7/4813; G01S 17/931; G01S 7/027; G01S 2007/4977; G01S 2013/9327; B60R 11/00; B60R 2011/0042
See application file for complete search history.

(56) References Cited

U.S. PATENT DOCUMENTS

| | | | |
|---|---|---|---|
| 2017/0151933 A1* | 6/2017 | Doorley | B60S 1/482 |
| 2017/0369039 A1 | 12/2017 | Rousseau | |
| 2019/0275990 A1* | 9/2019 | Agrotis | B60S 1/486 |

FOREIGN PATENT DOCUMENTS

| | | |
|---|---|---|
| CN | 107380126 A | 11/2017 |
| CN | 107578680 A | 1/2018 |
| CN | 108162921 A | 6/2018 |
| CN | 108196480 A | 6/2018 |
| CN | 206229758 U | 6/2018 |
| CN | 108583453 A | 9/2018 |
| EP | 3141441 A1 | 3/2017 |
| JP | H0514961 U | 2/1993 |
| WO | 2018081406 A1 | 5/2018 |

OTHER PUBLICATIONS

Chinese Application No. 201810692082.9, First Office Action dated Sep. 20, 2019, pp. 1-9.
Chinese Application No. 201810692082.9, Second Office Action, dated May 15, 2020.
European Patent Office, Extended European Search Report for EP 19826763.5, dated Mar. 15, 2022, 6 pages.

\* cited by examiner

SENSOR MOUNTING APPARATUS

The present disclosure is a continuation of and claims priority to International Patent Application No. PCT/CN2019/093590, titled "SENSOR MOUNTING APPARATUS", filed Jun. 28, 2019 and which claims priority to Chinese Patent Application No. 201810692082.9, titled "SENSOR MOUNTING APPARATUS", filed on Jun. 28, 2018, the content of which is incorporated herein by reference in its entirety.

TECHNICAL FIELD

The present disclosure relates to autonomous vehicle technology, and more particularly, to a sensor mounting apparatus.

BACKGROUND

An autonomous vehicle can use vehicle-mounted sensors to perceive information on its surrounding environment, such as information on types, shapes, positions, and distances of obstacles, and then determine driving decision information, such as acceleration, deceleration, or steering, based on the information on the environment and a driving path obtained by means of navigation, such that the vehicle can move safely and reliably. For vehicle mounted sensors that are mounted outside the vehicle's compartment, there are often situations in which the sensors are contaminated or damaged due to poor conditions of the external environment, which may cause the sensors to malfunction. For example, various stains (such as bird droppings, muddy water, rain water, dust, etc.) may adhere to a surface of a lens of a sensor, which may lead to inaccurate environment information collected by the sensor. As another example, small stones may hit a lens of a sensor, which may cause cracks and scratches on the lens of the sensor.

SUMMARY

The embodiments of the present disclosure provide a sensor mounting apparatus that can be used to mount a vehicle-mounted sensor, capable of avoiding external contamination or damage to the vehicle-mounted sensor, and cleaning a housing of the sensor mounting apparatus timely so as to avoid contamination of the housing, which would otherwise affect normal operation of the sensor.

According to an embodiment of the present disclosure, a sensor mounting apparatus is provided. The sensor mounting apparatus includes a housing, a guiding component provided on the housing, a first cleaning member slidably arranged on the guiding component, and a first driving element. The housing has an accommodating cavity for accommodating a sensor, a light-transmitting surface is provided on a side of the accommodating cavity, and the guiding component is arranged in parallel with the light-transmitting surface. The first driving element is in transmission connection with the first cleaning member, and is configured to drive the first cleaning member to slide along the guiding component. The first cleaning member includes a second driving element and a cleaning element in transmission connection with the second driving element, the cleaning element having a cleaning portion that fits an outer surface of the light-transmitting surface; the cleaning portion has a cleaning area covering the outer surface of the light-transmitting surface as the first cleaning member slides from one end of the guiding component to another end of the guiding component; and the second driving element is configured to drive the cleaning element to swing back and forth around a direction perpendicular to the light-transmitting surface.

In an embodiment, the cleaning element may further include a connecting base, a supporting rod, and an elastic member. The connecting base may be in transmission connection with the second driving element. The supporting rod may have one end pivotally mounted to the connecting base via a first hinge shaft, and another end connected to the cleaning portion. The first hinge shaft may be arranged in parallel with the light-transmitting surface. The elastic member may have one end connected to a side of the connecting base that is close to the light-transmitting surface, and another end connected to a side of the supporting rod that is close to the cleaning portion.

In an embodiment, the cleaning portion may be a wiper blade with a hinge hole. The wiper blade may be pivotally mounted to the end of the supporting rod via a second hinge shaft passing through the hinge hole. The second hinge shaft may be arranged in parallel with the first hinge shaft. The hinge hole may be provided at a position close to a center of the wiper blade.

In an embodiment, the first cleaning member may further include a mounting base with an accommodating space, the mounting base may be provided with a through hole. The second driving element may be provided within the accommodating space and the cleaning element may be provided outside the accommodating space. The second driving element and the cleaning element may be in transmission connection with each other via the through hole.

In an embodiment, the mounting base may be provided with a lug. The lug may be provided with a through hole that cooperates with the guiding component, and the guiding component may penetrate through the through hole.

In an embodiment, the first driving element may include a motor and a lead screw. The lead screw may include a screw rod and a screw nut mounted to the screw rod, the motor may be in transmission connection with the screw rod, and the screw nut may be fixedly connected with the first cleaning member.

In an embodiment, the sensor mounting apparatus may further include a second cleaning member provided on the housing, and the second cleaning member may include a third driving element and a cylindrical spray head in transmission connection with the third driving element. The cylindrical spray head may face toward the outer surface of the light-transmitting surface and have a number of spray holes distributed in an extending direction on a circumferential surface of the cylindrical spray head. The third driving element may be configured to drive the cylindrical spray head to rotate back and forth, and the cylindrical spray head may be configured to spray a cleaning medium onto the outer surface of the light-transmitting surface.

In an embodiment, the second cleaning member may include a water supply pipeline, an air supply pipeline, and a heat supply pipeline connected to the cylindrical spray head via a rotary joint, respectively. The water supply pipeline, the air supply pipeline and the heat supply pipeline may be provided with a first switch valve, a second switch valve, and a third switch valve, respectively.

In an embodiment, the water supply pipeline may be provided with a first one-way valve that allows water to flow unidirectionally to the cylindrical spray head, the air supply pipeline may be provided with a second one-way valve that allows air to flow unidirectionally to the cylindrical spray head, and the heat supply pipeline may be provided with a third one-way valve that allows a warm flow to flow unidirectionally to the cylindrical spray head.

In an embodiment, the second cleaning member may further include a water pump provided on the water supply pipeline and upstream of the first switch valve, and an air pump provided on the air supply pipeline and upstream of the second switch valve.

According to the embodiments of the present disclosure, when the first driving element drives the first cleaning member to slide along the guiding component, the cleaning portion can clean the light-transmitting surface completely, thereby avoiding blind areas on the light-transmitting surface that cannot be cleaned. When the second driving element drives the cleaning element to swing, the cleaning portion can repeatedly clean a local dirty area on the light-transmitting surface to avoid residue of stubborn stains. With cooperation of these two cleaning schemes, the light-transmitting surface can always be clean and in a good light transmission condition. The solution according to the present disclosure can not only prevent the sensor from being contaminated by the outside world, but also clean the surface of the housing in which the sensor is mounted timely, so as to avoid malfunction of the sensor due to contamination of the surface of the housing.

DETAILED DESCRIPTION OF THE EMBODIMENTS

In order to solve the problem that a sensor may not function properly due to contamination, according to an embodiment of the present disclosure, a sensor mounting apparatus is provided. In the following, the present disclosure will be explained in further detail with reference to the embodiments such that the objects, technical solutions, and advantages of the present disclosure will become more apparent.

As shown in FIGS. 1 to 4, the sensor mounting apparatus according to an embodiment of the present disclosure includes a housing 10, a guiding component 20 provided on the housing 10, a first cleaning member 30 slidably arranged on the guiding component 20, and a first driving element 40.

The housing 10 has an accommodating cavity 11 for accommodating a sensor 100. A light-transmitting surface 12 is provided on a side of the accommodating cavity 11. The guiding component 20 is arranged in parallel with the light-transmitting surface 12.

The first driving element 40 is in transmission connection with the first cleaning member 30, and is configured to drive the first cleaning member 30 to slide along the guiding component 20.

The first cleaning member 30 includes a second driving element 31 and a cleaning element 32 in transmission connection with the second driving element 31. The cleaning element 32 has a cleaning portion 321 that fits an outer surface of the light-transmitting surface 12. The cleaning portion 321 has a cleaning area covering the outer surface of the light-transmitting surface 12 as the first cleaning member 30 slides from one end of the guiding component 20 to another end of the guiding component 20. The second driving element 31 is configured to drive the cleaning element 32 to swing back and forth around a direction perpendicular to the light-transmitting surface 12.

The sensor mounting apparatus according to the embodiment of the present disclosure can be applied to an autonomous vehicle for mounting various sensors 100 on the vehicle. The present disclosure is not limited to any specific type of the sensor 100, which can be for example a camera, a laser radar, a millimeter wave radar, or an infrared sensor, etc. In a specific implementation, the sensor 100 can be mounted within the accommodating cavity 11 of the housing 10 of the apparatus, and a probe can face toward the side of the accommodating cavity 11 on which the light-transmitting surface 12 is provided, so as to collect information about the surrounding environment of the vehicle. Since the vehicle will inevitably encounter weather with poor environmental conditions such as rain and snow while moving, in order to prevent the light-transmitting surface 12 of the accommodating cavity 11 from being contaminated by rainwater, dust, etc., in the embodiment of the present disclosure, the sensor mounting apparatus is provided with the first cleaning member 30 for cleaning the light-transmitting surface 12. As the first driving element 40 drives the first cleaning member 30 to slide along the guiding component 20, the cleaning portion 321 can clean the light-transmitting surface 12 completely, thereby avoiding blind areas on the light-transmitting surface 12 that cannot be cleaned. When the second driving element 31 drives the cleaning element 32 to swing, the cleaning portion 321 can repeatedly clean a local dirty area on the light-transmitting surface 12 to avoid residue of stubborn stains. With cooperation of these two cleaning schemes, the light-transmitting surface 12 can always be in a good light transmission condition, such that signals, such as rays, light waves, electromagnetic waves, etc., emitted by the sensor 100 within the housing 10 can pass through the light-transmitting surface 12 for achieving functions such as image capturing, measurement, and the like, thereby solving the problem in the related art that the sensor 100 may be contaminated and thus cannot function properly.

Figure 2:
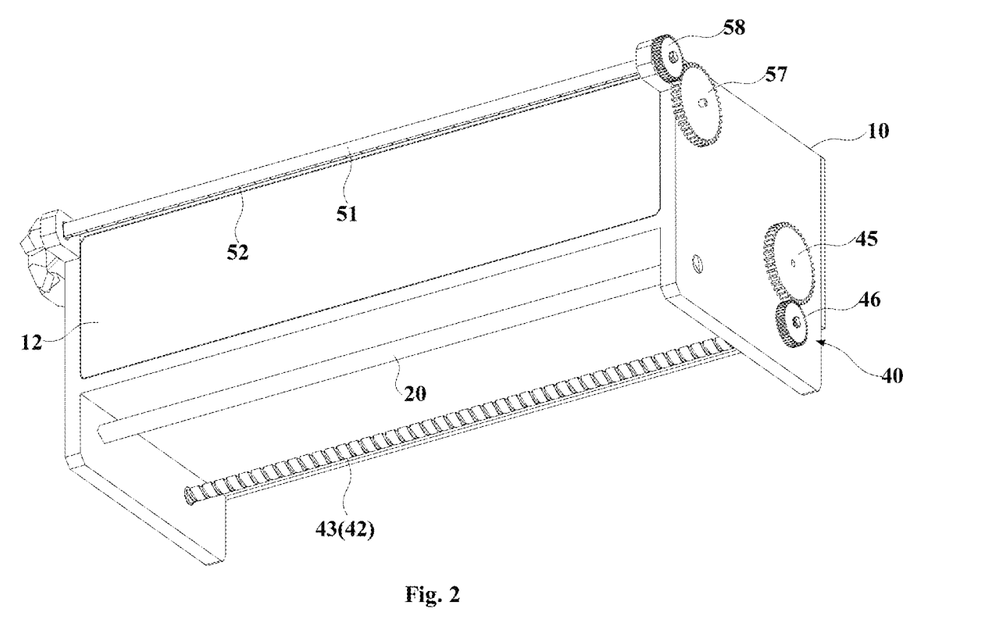
FIG. 2 is a second schematic diagram showing a structure of a sensor mounting apparatus according to an embodiment of the present disclosure.
Figure 3:
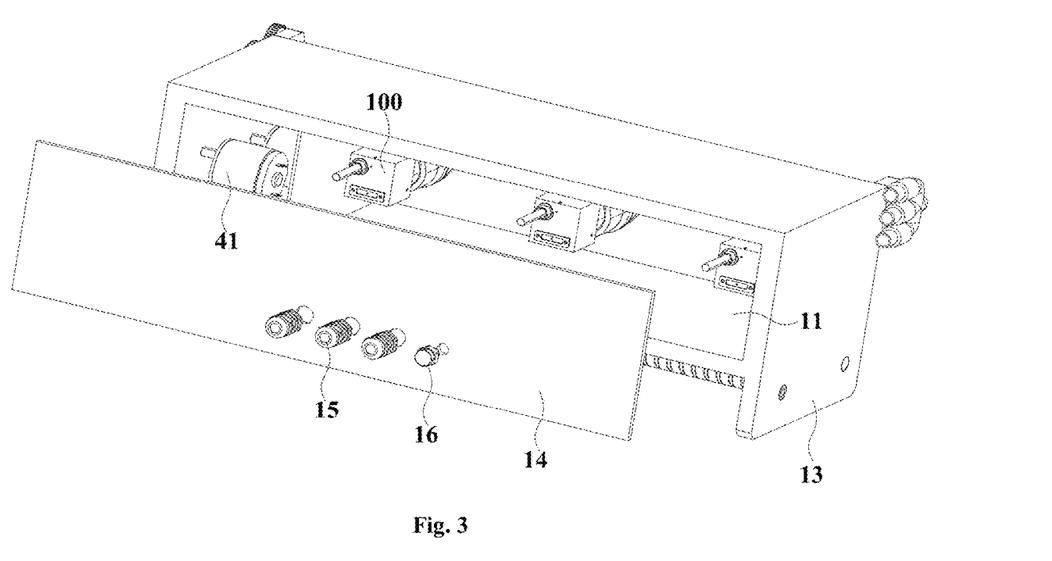
FIG. 3 is a third schematic diagram showing a structure of a sensor mounting apparatus according to an embodiment of the present disclosure.
Figure 4:
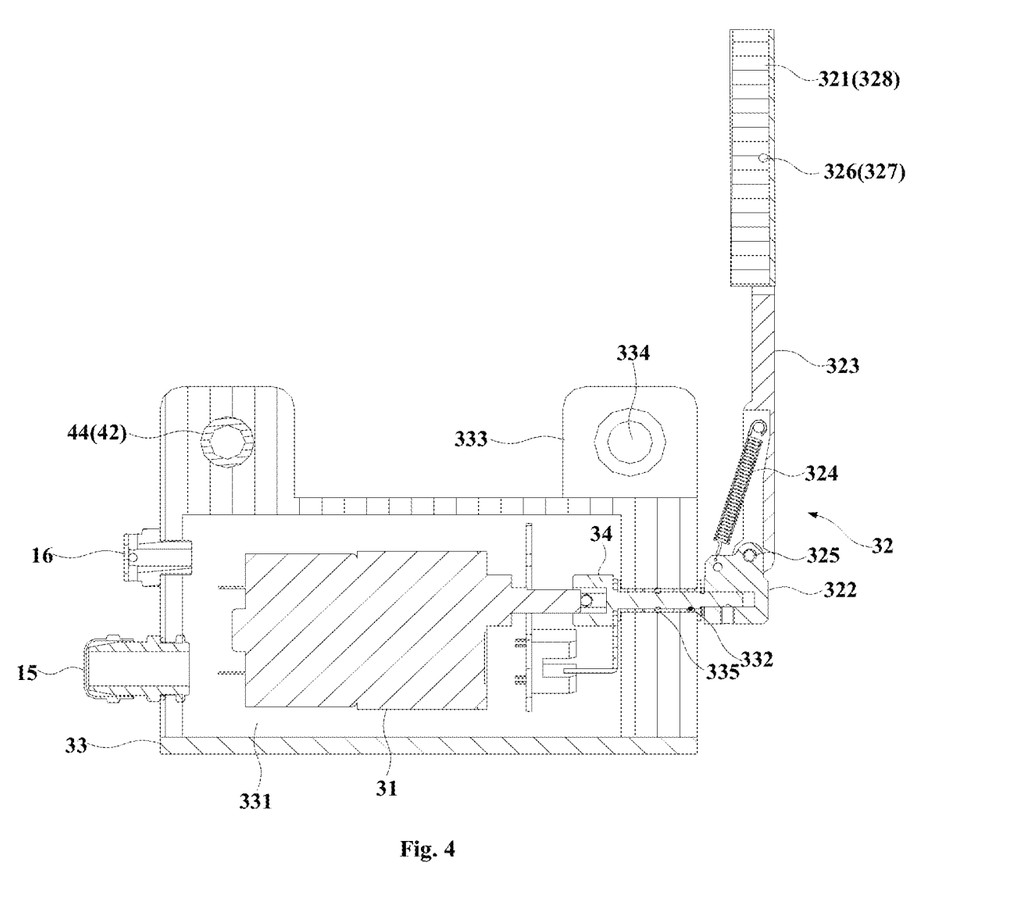
FIG. 4 is a schematic cross-sectional view of a first cleaning member according to an embodiment of the present disclosure.

The present disclosure is not limited to any specific structure of the guiding component 20. For example, it may be a slide rail or a guide rod. The present disclosure is not limited to any specific type of the first driving element. As shown in FIGS. 2, 3, and 4, in a preferred embodiment of the present disclosure, the first driving element 40 includes a motor 41 and a lead screw 42. The lead screw 42 includes a screw rod 43 and a screw nut 44 mounted to the screw rod 43. The motor 41 is in transmission connection with the screw rod 43. The screw nut 44 is fixedly connected to the first cleaning member 30. In this way, the rotary driving power outputted from the motor 41 can be converted by the lead screw 42 into linear driving power for driving the first cleaning member 30 to slide on the guiding component 20. This solution has a simple structure and a more reliable driving method. Here, the screw rod 43 can be pivotally mounted to the housing 10 via a shaft sleeve or a bearing, and the motor 41 and the screw rod 43 can be connected with each other directly or can be in transmission connection with each other via a gear set. For example, in FIG. 2, the first driving element 40 also includes a first main gear 45 and a first slave gear 46. The first main gear 45 is in transmission connection with an output shaft of the motor 41, and the first slave gear 46 is in transmission connection with the screw rod 43. The driving power outputted from the motor 41 can be transmitted to the screw rod 43 via the first main gear 45 and the first slave gear 46 that are engaged with each other. It can be appreciated that, in an embodiment of the present disclosure, the lead screw 42 can also be replaced by other structures, such as a gear-rack structure or a worm-gear structure, as long as the conversion between the rotary motion and the linear motion can be achieved, and details of such structures will be omitted here.

As shown in FIG. 3, the housing 10 may include a main housing body 13 and a back cover 14. The main housing body 13 and the back cover 14 are fixedly connected to form the accommodating cavity 11 for accommodating the sensor 100. The size of the accommodating cavity 11 can be designed as desired for accommodating one or more sensors 100. A sealing gasket can be provided at the connection between the main housing body 13 and the back cover 14. The sealing gasket can be elastically deformed to achieve sealing with a squeezing effect between the main housing body 13 and the back cover 14, thereby avoiding external impurities from entering the accommodating cavity 11. Of course, the motor 41 can also be arranged in the accommodating cavity 11. In this case, the back cover 14 can be provided with a wiring hole for connecting the motor 41 and the sensor 100 to the outside world. A waterproof connector 15 can be provided at an end of the wiring hole that is away from the accommodating cavity 11, for preventing the wiring from getting damp and causing signal transmission failures. In addition, a breather valve 16 can also be provided on the back cover 14. The waterproof and breathable performance of the breather valve 16 can not only prevent external water vapor from entering the accommodating cavity 11, but also keep a balanced pressure difference between the inside and outside of the accommodating cavity 11, such that condensation of water vapor within the accommodating cavity 11 can be avoided, which would otherwise adversely affect the performance of the sensor 100 and the motor 41.

In an embodiment of the present disclosure, the specific angle at which the second driving element 31 drives the cleaning element 32 to swing back and forth can be configured depending on actual conditions, and the present disclosure is not limited thereto. The present disclosure is not limited to any specific structure of the cleaning element 32 either. Preferably, as shown in FIG. 4, the cleaning element 32 may further include a connecting base 322, a supporting rod 323, and an elastic member 324. The connecting base 322 is in transmission connection with the second driving element 31. The supporting rod 323 has one end pivotally mounted to the connecting base 322 via a first hinge shaft 325, and another end connected to the cleaning portion 321. The first hinge shaft 325 is arranged in parallel with the light-transmitting surface. The elastic member 324 has one end connected to a side of the connecting base 322 that is close to the light-transmitting surface, and another end connected to a side of the supporting rod 323 that is close to the cleaning portion 321. Here, the present disclosure is not limited to any specific type of the elastic member 324. In an embodiment of the present disclosure, a tension spring is preferably used as the elastic member 324. An output shaft of the second driving element 31 can be directly connected to the connecting base 322, or its rotary motion can be transmitted to the connecting base 322 via a transmission shaft 34, enabling the connecting base 322 to drive the cleaning portion 321 connected to the supporting rod 323 to swing in a direction perpendicular to the light-transmitting surface. With this embodiment, the elastic effect of the elastic member 324 is utilized to apply a force to the supporting rod 323 to enable the supporting rod 323 to be pressed tightly onto the light-transmitting surface. Even if the light-transmitting surface is a non-planar structure, it is possible to ensure that the end of the supporting rod 323 that is connected to the cleaning portion 321 can always be pressed tightly onto the light-transmitting surface, such that the cleaning portion 321 can fit closely to the light-transmitting surface to achieve a better cleaning effect.

The present disclosure is not limited to any specific type of the cleaning portion 321. For example, it can be a scouring pad, a sponge, or a wiper blade. In an embodiment of the present disclosure, a wiper blade 328 is preferred. In a specific implementation, a hinge hole 326 can be provided at a position close to a center of the wiper blade 328. The wiper blade 328 can be pivotally mounted to the end of the supporting rod 323 via a second hinge shaft 327 passing through the hinge hole 326. It is to be noted that the second hinge shaft 327 should be arranged in parallel with the first hinge shaft 325, so as to ensure that the wiper blade 328 can rotate toward a side close to the light-transmitting surface. Moreover, since the hinge hole 326 is provided close to the center of the wiper blade 328, according to the principle of leverage, the pressures applied by two ends of the wiper blade 328 onto the light-transmitting surface are always relatively balanced. Thus, both ends of the wiper blade 328 can fit closely to the light-transmitting surface at the same time, such that the cleaning effect can be further improved.

As shown in FIG. 4, in a specific embodiment, the first cleaning member can further include a mounting base 33 with an accommodating space 331. The mounting base 33 is provided with a through hole 332. The second driving element 31 can be provided within the accommodating space 331, and the cleaning element 32 can be provided outside the accommodating space 331. The second driving element 31 and the cleaning element 32 are in transmission connection with each other via the through hole 332. In a specific implementation, the second driving element 31 and the cleaning element 32 are in transmission connection with each other via a transmission shaft 34 passing through the through hole 332. Meanwhile, in order to ensure smoothness of transmission, a structure such as a shaft sleeve or a bearing may be provided within the through hole 332. In addition, in an embodiment of the present disclosure, an inner wall of the through hole 332 is provided with an annular groove along the circumferential direction, and the first cleaning member further includes a sealing ring 335 that is interference fitted in the annular groove, so as to guarantee the sealing performance at the through hole 332 and effectively prevent external water vapor, aerial dust, impurities, etc. from entering the accommodating space 331 and adversely affecting the performance of the second driving element 31.

In the above embodiment, the mounting base 33 can be provided with a wiring hole for connecting the second driving element 31 to an external power source. An end of the wiring hole that is away from the accommodating space 331 is provided with a waterproof connector 15 for preventing the wiring from getting damp and thus causing signal transmission failures. In addition, a breather valve 16 can also be provided on the mounting base 33. The waterproof and breathable performance of the breather valve 16 can not only prevent external water vapor from entering the accommodating space 331, but also keep a balanced pressure difference between the inside and outside of the accommodating space 331, such that condensation of water vapor within the accommodating space 331 can be avoided, which would otherwise adversely affect the performance of the second driving element 31.

Figure 1:
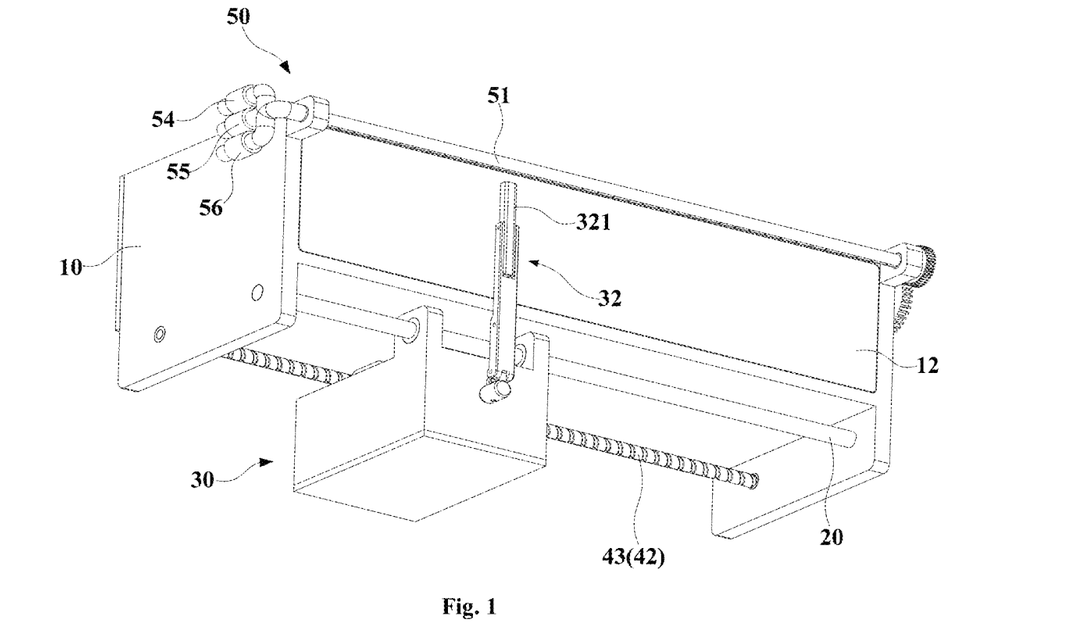
FIG. 1 is a first schematic diagram showing a structure of a sensor mounting apparatus according to an embodiment of the present disclosure.

Referring to FIGS. 1 and 4, in a specific embodiment, the mounting base can be provided with a lug 333, and the lug 333 can be provided with a through hole 334 that cooperates with the guiding component. The guiding component penetrates through the through hole 334. In order to ensure smoothness of transmission, a structure such as a shaft sleeve or a bearing may also be provided within the through hole 334.

As shown in FIGS. 1 and 2, the sensor mounting apparatus may further include a second cleaning member 50 provided on the housing 10. The second cleaning member 50 includes a third driving element and a cylindrical spray head 51 in transmission connection with the third driving element. The cylindrical spray head 51 faces toward the outer surface of the light-transmitting surface 12, and has a number of spray holes 52 distributed in an extending direction on a circumferential surface of the cylindrical spray head 51. The third driving element is configured to drive the cylindrical spray head 51 to rotate back and forth, and the cylindrical spray head 51 is configured to spray a cleaning medium to the outer surface of the light-transmitting surface 12. As the cylindrical spray head 51 sprays the cleaning medium to the light-transmitting surface 12 to clean or blow the light-transmitting surface 12, stains on the light-transmitting surface 12 can be further cleaned. Driven by the third driving element, the cylindrical spray head 51 can rotate back and forth within a defined angle range, enabling the spraying area of the cylindrical spray head 51 to cover the light-transmitting surface 12, thereby guaranteeing the cleaning effect. Here, the third driving element and the cylindrical spray head 51 can be connected with each other directly, or can be in transmission connection with each other via a gear set. For example, in FIG. 2, an output shaft of the third driving element is in transmission connection with a second main gear 57, and the cylindrical spray head 51 is in transmission connection with a second slave gear 58, such that the driving power outputted from the third driving element can be transmitted to the cylindrical spray head 51 via the second master gear 57 and the second slave gear 58 that are engaged with each other.

The above embodiment is not limited to any specific type of the cleaning medium, and it can be e.g., a water flow, an air flow, a warm flow, etc. For these three commonly used cleaning media, in a specific embodiment, the second cleaning member may include a water supply pipeline, an air supply pipeline, and a heat supply pipeline connected to the cylindrical spray head via a rotary joint, respectively. The water supply pipeline, the air supply pipeline and the heat supply pipeline are provided with a first switch valve 54, a second switch valve 55, and a third switch valve 56, respectively. In this way, by controlling opening/closing of the three switch valves, different cleaning media can be selected to clean the light-transmitting surface, thereby further improving the cleaning effect. It is to be noted that the three switch valves operate independently from each other, that is, they can be opened individually or simultaneously. When only one of the switch valves is opened, the cylindrical spray head 51 sprays a single cleaning medium. When two or three of the switch valves are opened simultaneously, the cylindrical spray head 51 can spray a mixture of the cleaning media in the pipelines for which the switch valves are opened. In particular, this can be selected depending on actual conditions. For example, when the outdoor environment temperature is low and frosting occurs on the light-transmitting surface 12, only the third switch valve 56 can be opened. In this case, the cylindrical spray head 51 sprays a warm flow onto the light-transmitting surface 12 for defrosting. When impurities adhere to the light-transmitting surface 12, the first switch valve 54 and the second switch valve 55 can be opened simultaneously. In this case, the cylindrical spray head 51 sprays a mixture of water and air onto the light-transmitting surface 12, which can not only blow away the impurities, but also clean the stains formed by the adhering impurities. In addition, in order to further improve the cleaning effect, in an embodiment of the present disclosure, the second cleaning member may further include a water pump provided on the water supply pipeline and upstream of the first switch valve, and an air pump provided on the air supply pipeline and upstream of the second switch valve. In this way, the water pump and the air pump can pressurize the water flow and the air flow in the water supply pipeline and the air supply pipeline, respectively. That is, when the first switch valve 54 and/or the second switch valve 55 are opened, the cylindrical spray head can spray high-pressure water flow and/or air flow onto the light-transmitting surface, thereby increasing the cleaning power of the second cleaning member.

In addition, in an embodiment of the present disclosure, the first cleaning member and the second cleaning member can be used in combination with each other. For example, the second cleaning member can spray water or a mixture of water and air onto the light-transmitting surface while the first cleaning member is rubbing the light-transmitting surface, so as to obtain a better cleaning effect.

In the above embodiment, the sensor mounting apparatus may further include a water storage container, an air storage container, and a heating device to provide the required cleaning medium for the water supply pipeline, the air supply pipeline, and the heat supply pipeline, respectively. When the sensor mounting apparatus is applied to an autonomous vehicle, the water supply pipeline, the air supply pipeline and the heat supply pipeline can also be connected to the vehicle's water tank, air storage tank, and air conditioning heater, respectively, without the need for the above devices in this case.

In a specific embodiment, the water supply pipeline can be provided with a first one-way valve that allows water to flow unidirectionally to the cylindrical spray head. The air supply pipeline can be provided with a second one-way valve that allows air to flow unidirectionally to the cylindrical spray head. The heat supply pipeline can be provided with a third one-way valve that allows a warm flow to flow unidirectionally to the cylindrical spray head. According to the solution of this embodiment, the backflow phenomenon of the cleaning medium can be prevented, and the reliability of the sensor mounting apparatus can be improved.

Obviously, various modifications and variants can be made to the present disclosure by those skilled in the art without departing from the spirit and scope of the present disclosure. Therefore, these modifications and variants are to be encompassed by the present disclosure if they fall within the scope of the present disclosure as defined by the claims and their equivalents.

What is claimed is:

1. A sensor mounting apparatus, comprising a housing, a guiding component provided on the housing, a first cleaning member slidably arranged on the guiding component, and a first driving element, wherein:

the housing has an accommodating cavity for accommodating a sensor, a light-transmitting surface is provided on a side of the accommodating cavity, and the guiding component is arranged in parallel with the light-transmitting surface, the first driving element is in transmission connection with the first cleaning member, and is configured to drive the first cleaning member to slide along the guiding component, and the first cleaning member comprises a second driving element and a cleaning element in transmission connection with the second driving element, the cleaning element having a cleaning portion that fits an outer surface of the light-transmitting surface; the cleaning portion has a cleaning area covering the outer surface of the light-transmitting surface as the first cleaning member slides from one end of the guiding component to another end of the guiding component; and the second driving element is configured to drive the cleaning element to swing back and forth around a direction perpendicular to the light-transmitting surface, wherein the first cleaning member further comprises a mounting base with an accommodating space, the second driving element is provided within the accommodating space and the cleaning element is provided outside the accommodating space, a breather valve is provided on the mounting base to prevent external water vapor from entering the accommodating space and keep a balanced pressure difference between an inside and an outside of the accommodating space.

2. The sensor mounting apparatus of claim 1, wherein the cleaning element further comprises a connecting base, a supporting rod, and an elastic member, wherein the connecting base is in transmission connection with the second driving element; the supporting rod has one end pivotally mounted to the connecting base via a first hinge shaft, and another end connected to the cleaning portion, the first hinge shaft being arranged in parallel with the light-transmitting surface; the elastic member has one end connected to a side of the connecting base that is close to the light-transmitting surface, and another end connected to a side of the supporting rod that is close to the cleaning portion.

3. The sensor mounting apparatus of claim 2, wherein the cleaning portion is a wiper blade with a hinge hole, the wiper blade is pivotally mounted to the end of the supporting rod via a second hinge shaft passing through the hinge hole, the second hinge shaft is arranged in parallel with the first hinge shaft, and the hinge hole is provided at a position close to a center of the wiper blade.

4. The sensor mounting apparatus of claim 1, wherein, the mounting base is provided with a first through hole, and the second driving element and the cleaning element are in transmission connection with each other via the first through hole.

5. The sensor mounting apparatus of claim 1, wherein the mounting base is provided with a lug, the lug is provided with a second through hole that cooperates with the guiding component, and the guiding component penetrates through the second through hole.

6. The sensor mounting apparatus of claim 1, wherein the first driving element comprises a motor and a lead screw, the lead screw comprises a screw rod and a screw nut mounted to the screw rod, the motor is in transmission connection with the screw rod, and the screw nut is fixedly connected with the first cleaning member.

7. The sensor mounting apparatus of claim 1, further comprising a second cleaning member provided on the housing, and the second cleaning member comprises a third driving element and a cylindrical spray head in transmission connection with the third driving element, the cylindrical spray head faces toward the outer surface of the light-transmitting surface and has a number of spray holes distributed in an extending direction on a circumferential surface of the cylindrical spray head, the third driving element is configured to drive the cylindrical spray head to rotate back and forth, and the cylindrical spray head is configured to spray a cleaning medium onto the outer surface of the light-transmitting surface.

8. The sensor mounting apparatus of claim 7, wherein the second cleaning member comprises a water supply pipeline, an air supply pipeline, and a heat supply pipeline connected to the cylindrical spray head via a rotary joint, respectively, and the water supply pipeline, the air supply pipeline and the heat supply pipeline are provided with a first switch valve, a second switch valve, and a third switch valve, respectively.

9. The sensor mounting apparatus of claim 8, wherein the water supply pipeline is provided with a first one-way valve that allows water to flow unidirectionally to the cylindrical spray head, the air supply pipeline is provided with a second one-way valve that allows air to flow unidirectionally to the cylindrical spray head, and the heat supply pipeline is provided with a third one-way valve that allows a warm flow to flow unidirectionally to the cylindrical spray head.

10. The sensor mounting apparatus of claim 8, wherein the second cleaning member further comprises a water pump provided on the water supply pipeline and upstream of the first switch valve, and an air pump provided on the air supply pipeline and upstream of the second switch valve.

11. The sensor mounting apparatus of claim 1, wherein:
the mounting base is provided with a first wiring hole for connecting the second driving element to an external power source; and
a first waterproof connector is provided at an end of the first wiring hole that is away from the accommodating space.

12. The sensor mounting apparatus of claim 4, wherein:
an inner wall of the first through hole is provided with an annular groove; and
the first cleaning member further comprises a sealing ring that is interference fitted in the annular groove.

13. The sensor mounting apparatus of claim 1, wherein:
the housing comprises a main housing body and a back cover; and
the main housing body and the back cover are fixedly connected to form the accommodating cavity for accommodating the sensor.

14. The sensor mounting apparatus of claim 13, wherein the back cover comprises a second wiring hole for connecting a motor of the guiding component and the sensor to an outside world; and
the sensor mounting apparatus further comprises a second waterproof connector provided at an end of the second wiring hole that is away from the accommodating cavity.

15. The sensor mounting apparatus of claim 13, wherein the breather valve is a first breather valve, and a second breather valve is provided on the back cover to prevent external water vapor from entering the accommodating cavity and keep a balanced pressure difference between an inside and an outside of the accommodating cavity.

16. The sensor mounting apparatus of claim 1, wherein the first driving element comprises a motor arranged in the accommodating cavity.

17. The sensor mounting apparatus of claim 13, further comprising a sealing gasket provided at the connection between the main housing body and the back cover.

18. The sensor mounting apparatus of claim 1, wherein the mounting base is slidable along the guiding component.

\* \* \* \* \*